United States Patent
Herbert

(10) Patent No.: US 6,545,953 B1
(45) Date of Patent: Apr. 8, 2003

(54) AUDIO SIGNAL MANIPULATOR SYSTEM

(76) Inventor: Lawrence A. Herbert, 1923 Panay Ct., San Diego, CA (US) 92105

( * ) Notice: Subject to any disclaimer, the term of this patent is extended or adjusted under 35 U.S.C. 154(b) by 91 days.

(21) Appl. No.: 09/815,710

(22) Filed: Mar. 23, 2001

(51) Int. Cl.$^7$ ................................................. H04B 1/20
(52) U.S. Cl. ............................................. 369/4; 381/119
(58) Field of Search ................................. 369/4, 2, 3, 5, 369/30.27, 33.01; 381/119, 58

(56) References Cited

U.S. PATENT DOCUMENTS

| | | | |
|---|---|---|---|
| 4,064,364 A | * 12/1977 | Veale | 369/4 |
| 4,201,895 A | * 5/1980 | Hill, Jr. | 369/4 |
| D275,674 S | 9/1984 | Marino | |
| 5,126,981 A | * 6/1992 | Kim | 369/2 |
| 5,148,491 A | * 9/1992 | Sakamoto et al. | 381/119 |
| 5,170,381 A | * 12/1992 | Taylor et al. | 369/4 |
| 5,206,842 A | * 4/1993 | Spector | 369/4 |
| 5,230,024 A | * 7/1993 | Zampini et al. | 381/119 |
| 5,293,358 A | * 3/1994 | Krause | 369/2 |
| 5,347,499 A | * 9/1994 | Woo | 369/4 |
| 5,444,676 A | * 8/1995 | Balsamo et al. | 369/4 |
| 5,471,539 A | * 11/1995 | Flum et al. | 381/119 |
| 5,647,008 A | 7/1997 | Farhangi et al. | |
| 5,675,557 A | 10/1997 | Hubinger | |
| 5,734,731 A | 3/1998 | Marx | |
| 5,870,708 A | * 2/1999 | Stewart | 704/275 |
| 5,896,459 A | 4/1999 | Williams, Jr. | |
| 6,434,242 B2 | * 8/2002 | Yamada et al. | 381/119 |

* cited by examiner

Primary Examiner—Tan Dinh

(57) ABSTRACT

An audio signal manipulator system for manually manipulating digital audio signals to simulate the audio sounds emitted when a user mixes vinyl records. The audio signal manipulator system includes a console for storing and manipulating a digital signal input received from a multimedia input apparatus. A manipulating assembly comprising a stand and an effects disk mountable to a phonograph, and a transducer is provided for manually manipulating media currently playing in the console. The transducer is preferably mounted on the stand for selectively engaging the effects disk such that it reads a rotational direction and a rotational speed of the effects disk. In one embodiment of the present invention, manual movement of the effects digitally manipulates the media stored in the console.

20 Claims, 5 Drawing Sheets

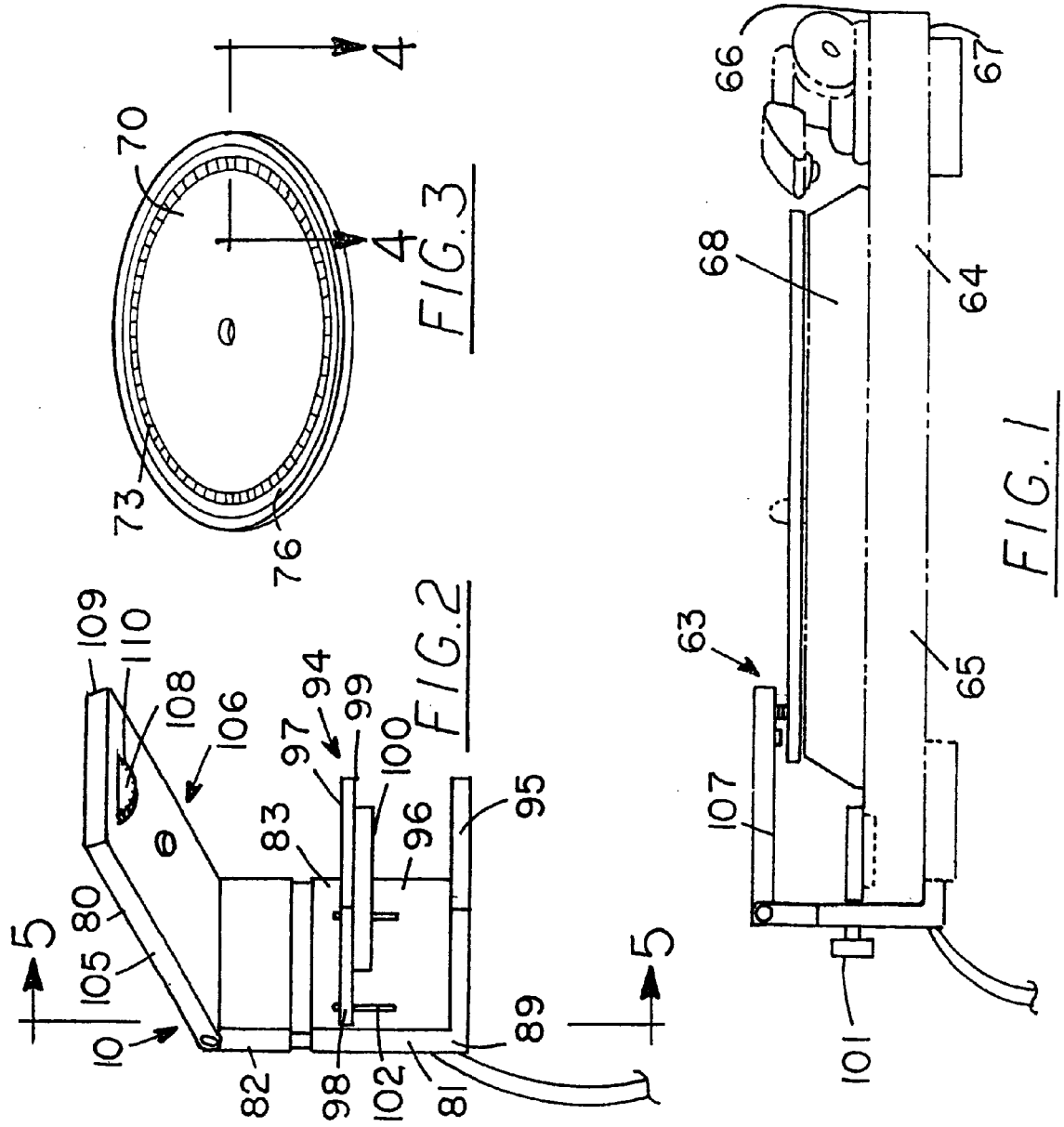

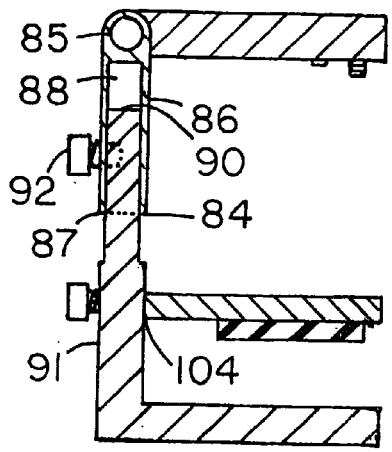

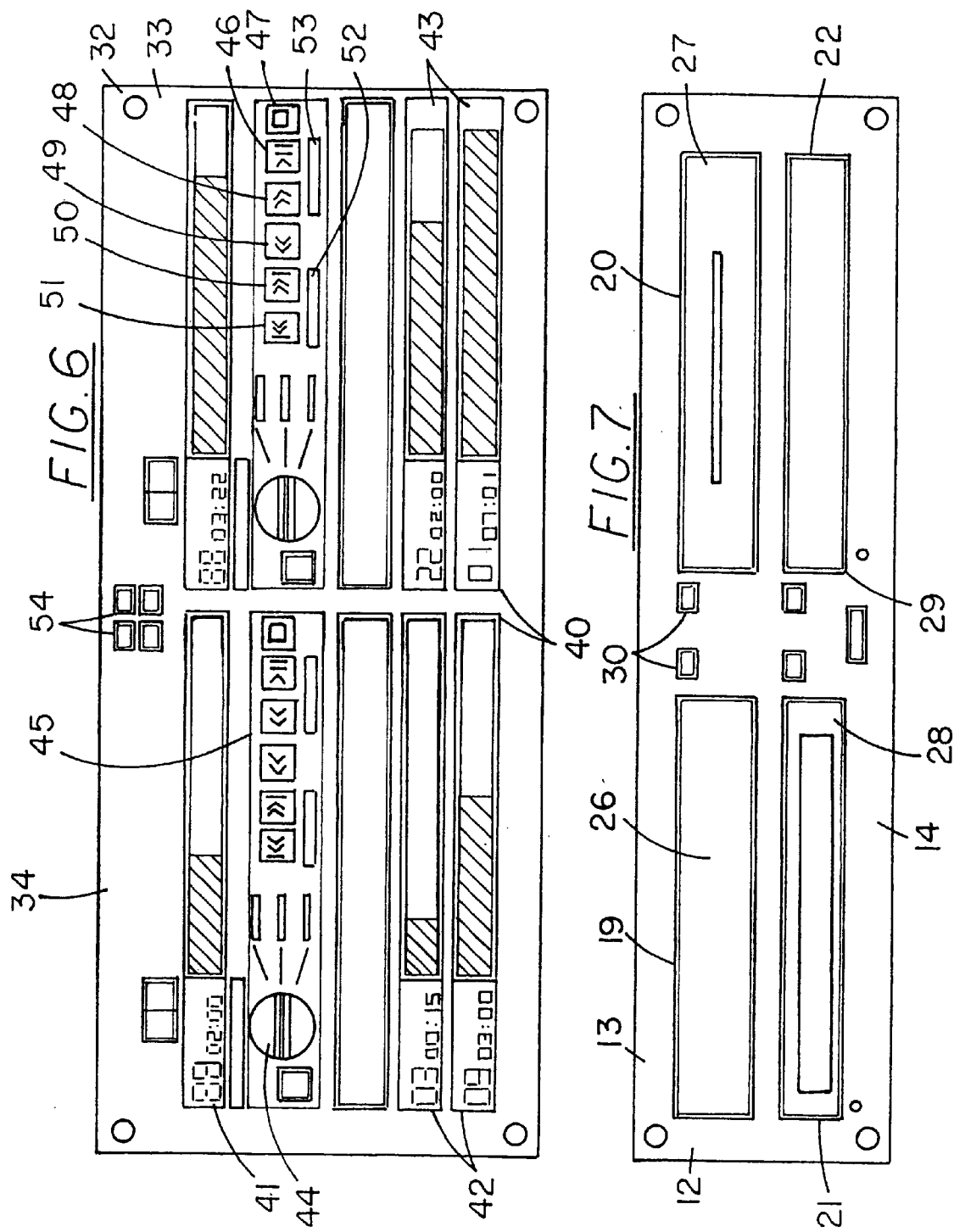

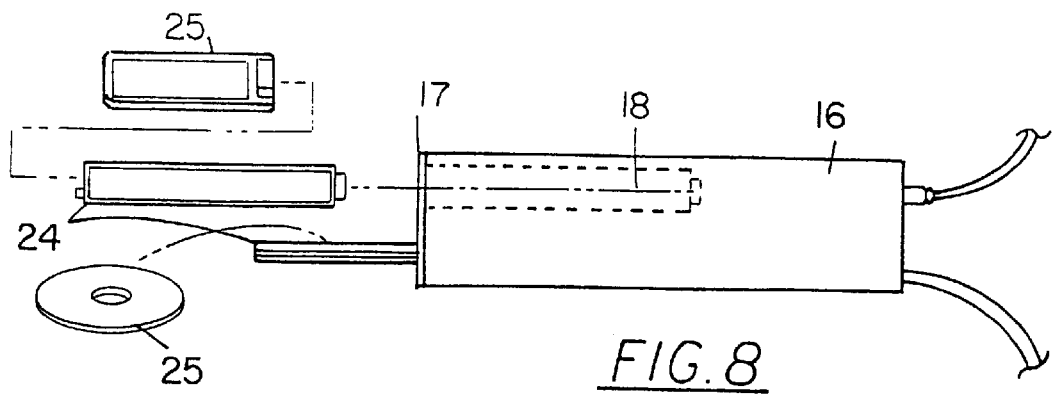
FIG. 8
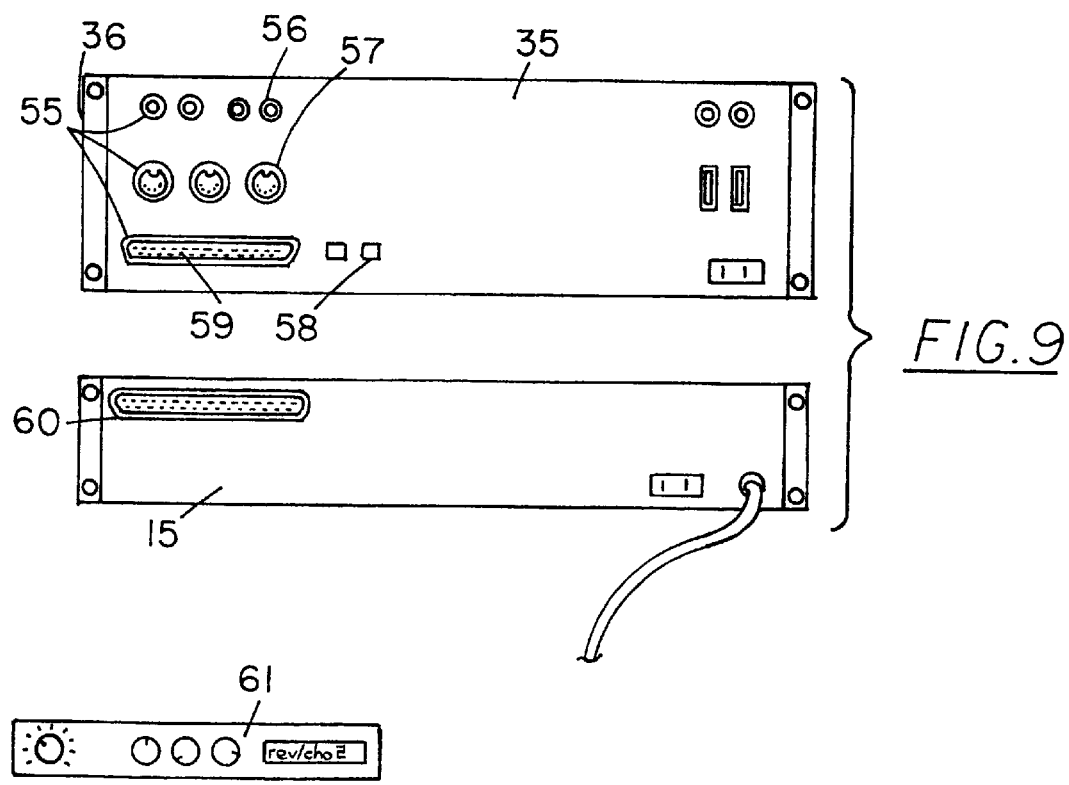
FIG. 9
FIG. 10

AUDIO SIGNAL MANIPULATOR SYSTEM

BACKGROUND OF THE INVENTION

1. Field of the Invention

The present invention relates to audio mixers and more particularly pertains to a new audio signal manipulator system for manually manipulating digital audio signals to simulate the audio sounds emitted when a user mixes vinyl records.

2. Description of the Prior Art

The use of audio mixers is known in the prior art. More specifically, audio mixers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,675,557; U.S. Pat. No. 4,201,895; U.S. Pat. No. 5,734,731; U.S. Pat. No. Des 275,674; U.S. Pat. No. 5,647,008; and U.S. Pat. No. 5,896,459.

While these devices fulfill their respective, particular objectives and requirements, the aforementioned patents do not disclose a new audio signal manipulator system. The inventive device includes a console for storing and manipulating a digital signal input received from a multimedia input apparatus. A manipulating assembly comprising a stand, a phonograph, an effects disk and a transducer is provided for manipulating media currently playing in the console. The phonograph includes a base and a turntable with the effects disk being removably mounted on the turntable. The stand may be removably mountable on the base of the phonograph. The stand preferably includes an upstanding member having an arm member is pivotally coupled to an end of the upstanding member and positionable over the turntable. The transducer is preferably mounted on the arm member for selectively engaging the effects such that it reads a rotational direction and a rotational speed of the effects disk. In one embodiment of the present invention, movement of the effects digitally manipulates the media stored in the console.

In these respects, the audio signal manipulator system according to the present invention substantially departs from the conventional concepts and designs of the prior art, and in so doing provides an apparatus primarily developed for the purpose of manually manipulating digital audio signals to simulate the audio sounds emitted when a user mixes vinyl records.

SUMMARY OF THE INVENTION

In view of the foregoing disadvantages inherent in the known types of audio mixers now present in the prior art, the present invention provides a new audio signal manipulator system construction wherein the same can be utilized for manually manipulating digital audio signals to simulate the audio sounds emitted when a user mixes vinyl records.

The general purpose of the present invention, which will be described subsequently in greater detail, is to provide a new audio signal manipulator system apparatus and method which has many of the advantages of the audio mixers mentioned heretofore and many novel features that result in a new audio signal manipulator system which is not anticipated, rendered obvious, suggested, or even implied by any of the prior art audio mixers, either alone or in any combination thereof.

To attain this, the present invention generally comprises a console for storing and manipulating a digital signal input received from a multimedia input. A manipulating assembly comprising a stand, a phonograph, an effects disk and a transducer is provided for manipulating media currently playing in the console. The phonograph includes a base and a turntable with the effects disk being removably mounted on the turntable. The stand may be removably mountable on the base of the phonograph. The stand preferably includes an upstanding member having an arm member is pivotally coupled to an end of the upstanding member and positionable over the turntable. The transducer is preferably mounted on the arm member for selectively engaging the effects such that it reads a rotational direction and a rotational speed of the effects disk. In one embodiment of the present invention, movement of the effects digitally manipulates the media stored in the console.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new audio signal manipulator system apparatus and method which has many of the advantages of the audio mixers mentioned heretofore and many novel features that result in a new audio signal manipulator system which is not anticipated, rendered obvious, suggested, or even implied by any of the prior art audio mixers, either alone or in any combination thereof.

It is another object of the present invention to provide a new audio signal manipulator system which may be easily and efficiently manufactured and marketed.

It is a further object of the present invention to provide a new audio signal manipulator system which is of a durable and reliable construction.

An even further object of the present invention is to provide a new audio signal manipulator system which is susceptible of a low cost of manufacture with regard to both materials and labor, and which accordingly is then susceptible of low prices of sale to the consuming public, thereby making such audio signal manipulator system economically available to the buying public.

Still yet another object of the present invention is to provide a new audio signal manipulator system which provides in the apparatuses and methods of the prior art some of the advantages thereof, while simultaneously overcoming some of the disadvantages normally associated therewith.

Still another object of the present invention is to provide a new audio signal manipulator system for manually manipulating digital audio signals to simulate the audio sounds emitted when a user mixes vinyl records.

Yet another object of the present invention is to provide a new audio signal manipulator system which includes a console for storing and manipulating a digital signal input received from a multimedia input. A manipulating assembly comprising a stand, a phonograph, an effects disk and a transducer is provided for manipulating media currently playing in the console. The phonograph includes a base and a turntable with the effects disk being removably mounted on the turntable. The stand may be removably mountable on the base of the phonograph. The stand preferably includes an upstanding member having an arm member is pivotally coupled to an end of the upstanding member and positionable over the turntable. The transducer is preferably mounted on the arm member for selectively engaging the effects such that it reads a rotational direction and a rotational speed of the effects disk. In one embodiment of the present invention, movement of the effects digitally manipulates the media stored in the console.

Still yet another object of the present invention is to provide a new audio signal manipulator system that, unlike the prior art, allows a user to manually manipulate store digital audio signals to simulate a sound emitted when a user mixes two vinyl records.

Even still another object of the present invention is to provide a new audio signal manipulator system that allows a user to manually manipulate digital audio signals that are clear sounding. Prior to the present invention, users had to manually manipulate vinyl records that had poor sound quality. Additionally, a user is more portable then when vinyl records had to be moved. Since compact disks and other digital storage means are smaller, a user can more easily transport their media.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new audio signal manipulator system according to the present invention showing manipulating assembly.

FIG. 2 is a schematic perspective view of the present invention showing a stand of the manipulating assembly.

FIG. 3 is a schematic perspective view of the present invention showing an effects disk.

FIG. 4 is a schematic cross-sectional view of the present invention taken along line 4—4 of FIG. 3.

FIG. 5 is a schematic cross-sectional view of the present invention taken along line 5—5 of FIG. 2.

FIG. 6 is a schematic frontal view of the present invention showing a console.

FIG. 7 is a schematic frontal view of the present invention showing a multimedia input assembly.

FIG. 8 is a schematic exploded view of the present invention showing multimedia drives and media in the multimedia input assembly.

FIG. 9 is a schematic back view of the present invention showing a back wall of the console and the multimedia input assembly.

FIG. 10 is a schematic front view of the present invention showing an effects unit.

DESCRIPTION OF THE PREFERRED EMBODIMENT

Figure 11:
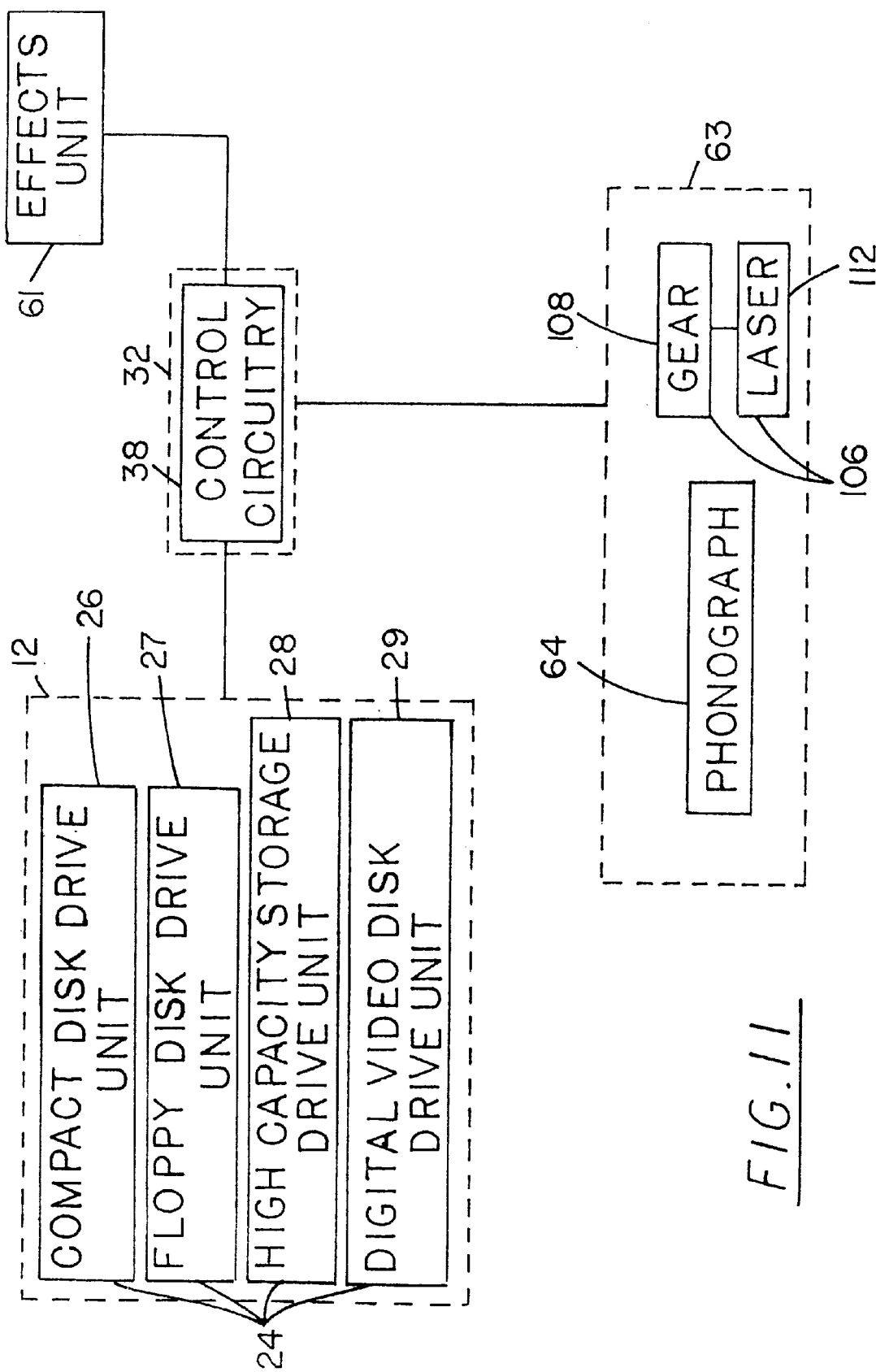
FIG. 11 is a schematic diagram of the present invention.

With reference now to the drawings, and in particular to FIGS. 1 through 11 thereof, a new audio signal manipulator system embodying the principles and concepts of the present invention and generally designated by the reference numeral 10 will be described.

As best illustrated in FIGS. 1 through 11, the audio signal manipulator system 10 generally comprises a multimedia input apparatus 12, a console 32, and a manipulating assembly 63 for altering the sound of digital signals such that they sound similar to the manipulation of vinyl records on a phonograph.

The multimedia input apparatus 12 is provided for receiving a plurality of digital signal inputs. The multimedia input apparatus 12 preferably comprises a housing 13 that includes a front wall 14, a back wall 15 and a peripheral wall 16 extending between the front 14 and back 15 walls. The front wall 14 includes a plurality of openings 17 extending into a plurality of multimedia bays 18. The plurality of multimedia bays 17 may include a first 19, a second 20, a third 21, and a fourth 22 multimedia bay.

Preferably a plurality of multimedia drive units 24 is provided for reading media 25. As illustrated in FIG. 5, each of the multimedia drive units 24 is removably positioned in a respective multimedia bay 18 of the housing 13. The plurality of multimedia drive unit 24 may comprise a compact disk drive unit 26 that may be removably positioned in the first multimedia bay 19 for reading a compact disc media. A floppy disk drive unit 27 may be removably positioned in the second multimedia bay 20 for reading a floppy disk media. A high capacity storage drive unit 28 may be removably positioned in the third multimedia bay 21 for reading a high capacity storage device media. Lastly, a digital video disk drive unit 29 may be removably positioned the fourth multimedia bay 22 for reading a digital video disk media. The multimedia input apparatus 12 may have any combination or variation of the multimedia drive units 24 in the housing 14, for instance, all the multimedia bays 18 may have compact disk drive units 26 position in them.

As illustrated in FIG. 5, a plurality of eject buttons 30 may be mounted on the front wall 14 of the housing 13 for ejecting the media 25 from the multimedia drive units 24. Each of the eject buttons 30 is electrically connected to a respective multimedia drive unit 24. Each of the eject buttons 30 may be positioned generally adjacent to its respective multimedia drive unit 24.

The console 32 is provided for storing and manipulating the digital signal inputs from the multimedia input apparatus 12. The console 32 is electrically connected to the multimedia input apparatus 12 for receiving the digital signal inputs. The console 32 preferably comprises a case 33 that includes a front wall 34, a back wall 35, and a peripheral wall 36 extending between the front 34 and the back 35 walls of the case 33. The case 33 may comprise a substantially rigid material such as, for example, an aluminum or steel material.

Control circuitry 38 is preferably mounted in the case 33 for controlling the console 32 and for controlling reception of the digital signal inputs from the multimedia input apparatus 12.

As illustrated in FIG. 4, a pair of control panels 40 may be provided for controlling storage and playing of the digital signal inputs. Each of the control panels 40 is mounted on the front wall 34 of the case 33. Each of the control panels 40 is electrically connected to the control circuitry 38. Each of the control panels 40 may comprise a current display 41 for indicating a track of the media 25 currently playing in one of the multimedia drives units 24. A pair of queue displays 42 may be provided for indicating a track of the media 25 in one of the multimedia drives units 24.

A plurality of selectors 43 may be provided for selecting a track of the media 25 in one of the multimedia drives units 24. Each of the selectors 43 is position generally adjacent to a respective display 41 and 42. Each of the selectors 43 preferably comprises a touch sensitive screen, although conventional knob and push button-type selectors may be employed.

A queue selector 44 may be provided for selecting between one of the tracks of media 25 displayed in one of the queue displays 42 and the track currently being played and displayed in the current display 41. The queue selector 44 may be positioned generally between the current display 41 and the pair of queue displays 42. A plurality of media controls 45 may be provided for controlling the media 25 in each of the multimedia drives units 24. The plurality of media controls 45 may be positioned generally adjacent to the queue selector 44.

The plurality of media controls 45 may comprise a play button 46 for playing a track of the media 25 and a stop button 47 for stopping the playing of a track of the media 25. The play button 46 may also pause the track of media 25 being played by pressing it while the track is playing. A forward button 48 and a reverse button 49 may be provided for advancing and reversing a track of the media. A fast forward button 50 and a fast reverse 51 button may be provided for more quickly forwarding or reversing a track of the media 25 being played. Additionally, a pitch control 52 may be provided for controlling a pitch of a track of the media 25. A playback speed control 53 may be provided for controlling a speed of a track of the media 25 that is being played.

A plurality of remote eject buttons 54 may be provided for remotely ejecting the media 25 from one of the multimedia drive units 24. Each of the remote eject buttons 54 may be positioned generally between each of the control panels 40.

As illustrated in FIG. 7, a plurality of jacks 55 may be mounted on the back wall 35 of the case 33 for electrically connecting the console 32 to the multimedia input apparatus 12 and for connecting the console 32 to a plurality of peripheral devices. Each of the jacks 55 is electrically connected to the control circuitry 32. The plurality of jacks 55 may comprise a plurality of RCA-type jacks 56 for electrically connecting the console to peripheral devices such as, for example, a turntable, a cassette player or a pair of headphones.

A plurality of MIDI-type jacks 57 may be provided for electrically connecting the console 32 to a plurality of MIDI devices such as, for example a keyboard. Each of the MIDI-type jacks is positioned generally adjacent to the RCA-type jacks.

A digital jack 58 may be provided for receiving and transmitting digital audio signals from a peripheral device that includes a digital jack such as, for example a compact disk player. A small computer system interface jack 59 may be provided that is connected to a small computer interface jack 60 of the multimedia input apparatus 32. In one embodiment of the present invention, the console 32 is in digital communication with the multimedia input apparatus 12 digitally transferring digital signal inputs through the small computer system interface jacks 59 and 60.

As illustrated in FIG. 8, an effects unit 61 may be provided for digitally altering the digital signal inputs from the multimedia input apparatus 12. The effects unit 61 may be removably mounted on the front wall 34 of the case 33. The effects unit 61 may be positioned generally between the queue selector 44 and the pair of queue displays 42. The effects unit 61 is electrically connected to the control circuitry 38. The effects unit 61 provides additional means of altering the sound of the digital signal inputs being played from the console 32.

As illustrated in FIGS. 1, 2, and 3, a manipulating assembly 63 is provided for manipulating the media 25 currently playing in the console 32. The manipulating assembly 63 preferably comprises a phonograph 64 for playing vinyl records. The phonograph 64 preferably includes a base 65 that includes an upper surface 66 and a lower surface 67. The phonograph 64 includes a turntable 68 that is movably mounted on the upper surface 66 of the base 65 of the phonograph 64.

As illustrated in FIG. 2, an effects disk 70 is provided for manipulating the media 25 stored in and currently playing in the console 32. The effects disk 70 is selectively mountable on the turntable 68. As particularly illustrated in FIG. 4, the effects disk 70 includes a top surface 71 that has a plurality of notches 72 extending therein. Each of the notches 72 is positioned generally adjacent to one another such that a gear track 73 of the notches 72 is defined. The gear track 73 extends around the effects disk 70 and is positioned generally adjacent to a peripheral edge 74 of the effects disk 70. The top surface 71 of the effects disk 70 also includes a plurality of pits 75 extending therein. Each of the pits 75 is positioned generally adjacent to one another such that an optical track 76 is defined. The optical track 76 is preferably positioned between the gear track 73 and the peripheral edge 74 of the effects disk 70.

As illustrated in FIG. 1, a stand 80 is provided that is removably mountable to the base 65 of the phonograph 64. The stand 80 preferably includes an upstanding member 81 that includes a first portion 82 and a second portion 83 selectively telescoping from the first portion 82. In one embodiment of the present invention, the first portion has a first end 84, a second end 85 and a peripheral wall 86 extending between the first 84 and second 85 ends. The first end 84 includes an opening 87 extending into a cavity 88 of the first portion 84. The second portion 83 has a first end 89, a second end 90 and a peripheral wall 91. The second end 90 of the second portion 83 is movably positioned in the cavity 88 of the first portion 82.

As illustrated in FIG. 5, a fastening member 92 may be provided for selectively fixing the first portion 82 in a position with respect to the second portion 83. The fastening member 92 may be removably extended through the peripheral wall 86 of the first portion 82 and removably mounted in the peripheral wall 91 of the second portion 83. The fastening member 92 may comprise a thumbscrew.

As illustrated in FIG. 1, a clamp assembly 94 may be provided for removably clamping the stand 80 to the base 65 of the phonograph 64. The clamp assembly 94 may include a lower clamp member 95 extending perpendicularly from a front side 96 of the upstanding member 81. The lower clamp member 95 is selectively abuttable against the lower surface 67 of the base 65 of the phonograph 64. An upper clamp member 97 is movably coupled to the second portion 83 of the upstanding member 81. The upper clamp member 97 preferably includes a plate 98. A lower surface 99 of the plate 98 includes a protruding portion 100 extending downwardly therefrom. The protruding portion 100 is selectively abuttable against the upper surface 66 of the base 65 of the phonograph 64. The protruding portion 100 may be positioned in a slot of the phonograph 64 adapted for holding an adapter used for playing 45s.

A pair of securing members 101 may be provided for selectively securing the plate 98 in a position with respect to the upstanding member 81. Each of the securing members 101 is removably extended through a pair of elongated slots 102 extending through the peripheral wall 91 of the second portion 83 and is removably mounted in a back surface 104 of the plate 98. Each of the slots 102 includes a longitudinal axis extending between the first 89 and second 90 ends of the second portion 83. Each of the securing members 101 may comprise a thumbscrew.

An arm member 105 is provided that is pivotally coupled to the second end 85 of the first portion 82 of the upstanding member 81. The arm member 105 is positioned generally parallel to the clamp assembly 94 and positionable over the turntable 68 when the stand 80 is removably mounted to the base 65 of the phonograph 64.

As illustrated in FIG. 1, a pair of transducers 106 is provided for reading a rotational direction and a rotational speed of the effects disk 70. Each of the transducers 106 is mounted on a lower surface 107 of the arm member 105 of the stand 80. A first of the transducers 106 preferably comprises a gear 108 that is positioned generally adjacent to an end 109 of the arm member 105. The gear includes a plurality of teeth 110 that selectively engage the plurality of notches 72 of the gear track 73.

A second of the transducers preferably comprises a laser 112. The laser 112 is preferably positioned generally adjacent to the gear 108. A light emitted from the laser 112 shines on the pits 75 of the optical track 76. Each of the transducers 106 is electrically connected to the control circuitry 38 of the console 32.

In use, the rotational direction of the effects disk 70 on the turntable 68 of the phonograph 64 is interpreted by the gear 108 engaging the notches 72 in the gear track 73. The rotational speed of the effects disk 70 is interpreted by the light of the laser 112 shining on the plurality of pits 75 in the optical track 76. In one embodiment of the present invention, the media 25 stored in the console 32 is digitally manipulated to alter the stored media's 25 sound. An optional embodiment of the present invention may employ a single transducer, such as the gear 108 or the laser 112, to read the speed and the direction of the effects disk 70. The optional embodiment could be manufactured such that it could use an effects disk having a single track, such as, for example the gear track 73 or the optical track 76, or a dual track.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An audio signal manipulator system for manipulating stored audio signals from an audio input device generally corresponding to manipulating a vinyl record on a conventional phonograph having a base and a turntable rotatably mounted on the base, said system comprising:

a console for storing and manipulating a digital signal input;

a multimedia input apparatus for receiving a plurality of digital signal inputs, said multimedia input apparatus being electrically connected to said console;

a manipulating assembly for manipulating said media currently playing in said console, said manipulating assembly comprising:

an effects disk being removably mountable on the turntable of the conventional phonograph to rotate with the turntable for manipulating the media stored in and currently playing in said console;

a stand being removably mountable on the base of the conventional phonograph, said stand including:

an upstanding member being removably mounted to the base of the conventional phonograph such that said upstanding member is maintained in a stationary relationship relative to the turntable of the conventional phonograph;

an arm member being pivotally coupled to an end of said upstanding member, said arm member being selectively positionable over the turntable of the conventional phonograph; and at least one transducer mounted on said arm member for reading a rotational direction and a rotational speed of said effects disk on the turntable of the conventional phonograph, said transducer selectively engaging said effects disk such that said transducer interprets said rotational direction and said rotational speed of said effects disk;

wherein said console digitally manipulates said media playing in said console to alter an output by said console of said media based on said rotational direction and said rotational speed of said effects disk as interpreted by said at least one transducer.

2. The audio signal manipulator system of claim 1, wherein said multimedia input apparatus comprises a housing and a plurality of multimedia drives removably mounted on said housing.

3. The audio signal manipulator system of claim 1, additionally comprising the conventional phonograph having the base and the turntable, said conventional phonograph being separable from said console for use as a convention record player.

4. The audio signal manipulator system of claim 2, wherein said plurality of multimedia drive units for reading media comprises:
   a compact disc drive unit being removably positioned in a first multimedia bay for reading a compact disc media;
   a floppy disk drive unit being removably positioned in a second multimedia bay for reading a floppy disk media;
   a high capacity storage drive unit being removably positioned in a third multimedia bay for reading a high capacity storage device media; and
   a digital video disk drive unit being removably positioned a fourth multimedia bay for reading a digital video disk media.

5. The audio signal manipulator system of claim 4, wherein said console comprises:
   a case having a front wall, a back wall;
   control circuitry mounted in said case for controlling said console and for controlling reception of said digital signal inputs from said multimedia input apparatus; and
   a pair of control panels for controlling storage and playing of said digital signal inputs, each of said control panels being mounted on said front wall of said case, each of said control panels being electrically connected to said control circuitry.

6. The audio signal manipulator system of claim 5, wherein each of said control panels comprises:
   a current display for indicating a track of said media currently playing in one of said multimedia drives units;
   a pair of queue displays for indicating a track of said media in one of said multimedia drives units;
   a plurality of selectors for selecting a track of said media in one of said multimedia drives units, each of said selectors comprising a touch sensitive screen;
   a queue selector for selecting between one of said tracks of media displayed in one of said queue displays and said track currently being played; and
   a plurality of media controls for controlling said media in each of said multimedia drives units.

7. The audio signal manipulator system of claim 6, wherein said plurality of media controls comprises:
   a play button for playing a track of said media;
   a stop button for stopping the playing of a track of said media;
   a forward button for advancing a track of said media;
   a reverse button for reversing a track of said media;
   a fast forward button for quickly advancing a track of said media;
   a fast reversing button for quickly advancing a track of said media;
   a pitch control for controlling a pitch of a track of said media;
   a playback speed control for controlling a speed of a track of said media being played back;
   a plurality of remote eject buttons for remotely ejecting said media from one of said multimedia drive units.

8. The audio signal manipulator system of claim 1, wherein said manipulating assembly additionally comprises mounting means for removably mounting said stand on the base of the conventional phonograph.

9. The audio signal manipulator system of claim 7, additionally including a plurality of jacks being mounted on said back wall of said case for electrically connecting said console to said multimedia input apparatus and to a plurality of peripheral devices, wherein said plurality of jacks comprises:
   a plurality of RCA-type jacks for electrically connecting said console to a turntable, a cassette player or a pair of headphones;
   a plurality of MIDI-type jacks for electrically connecting said console to a plurality of MIDI devices such as a keyboard;
   a digital jack for receiving and transmitting digital audio signals a peripheral device having a digital jack such as a compact disk player;
   a small computer system interface jack being connected to a small computer interface jack of said multimedia input apparatus, wherein said console is in digital communication with said multimedia input apparatus.

10. The audio signal manipulator system of claim 5, additionally including an effects unit for digitally altering said digital signal inputs from said multimedia input device, said effects unit being removably mounted on said front wall of said case.

11. The audio signal manipulator system of claim 1, wherein said effects disk includes a top surface having a plurality of notches extending therein, each of said notches being positioned generally adjacent to one another such that a gear track of said notches is defined, said gear track extending around said effects disk and positioned generally adjacent to a peripheral edge of said effects disk, said transducer selectively engaging said gear track.

12. The audio signal manipulator system of claim 11, wherein said transducer comprises a gear, said gear having a plurality of teeth, each of said teeth of said gear selectively engaging said plurality of notches of said gear track.

13. The audio signal manipulator system of claim 1, wherein said effects disk has a top surface, said top surface of said effects disk having a plurality of pits extending therein, each of said pits being positioned generally adjacent to one another such that an optical track is defined, said transducer selectively optically engaging said optical track.

14. The audio signal manipulator system of claim 13, wherein said transducers comprises a laser, a light emitted from said laser shines on said pits of said optical track.

15. The audio signal manipulator system of claim 1, wherein said upstanding member of said stand has a first portion and a second portion selectively telescoping from said first portion.

16. The audio signal manipulator system of claim 15, wherein said first portion has a first end having a opening extending into a cavity of said first portion, wherein said second portion has a second end being movably positioned in said cavity of said first portion.

17. The audio signal manipulator system of claim 16, additionally including a fastening member for selectively fixing said first portion in a position with respect to said second portion, said fastening member being removably extended through said peripheral wall of said first portion and removably mounted in a peripheral wall of said second portion.

18. The audio signal manipulator system of claim 8, wherein said mounting means comprises a clamp assembly including:
- a lower clamp member extending perpendicularly from a front side of said upstanding member, said lower clamp member being selectively abuttable against a lower surface of the base of the conventional phonograph; and
- an upper clamp member being movably coupled to and extending from the front of said upstanding member, said upper clamp member being selectively movable toward said lower clamp member for abutting against an upper surface of the base of the conventional phonograph.

19. The audio signal manipulator system of claim 18, wherein said upper clamp member includes a plate, a lower surface of said plate having a protruding portion extending downwardly therefrom, said protruding portion being selectively abuttable against the upper surface of the base of the conventional phonograph and a pair of fastening members for selectively fixing said plate in a position with respect to said upstanding member, each of said fastening members being removably extended through a pair of elongated slots extending through said upstanding member and being removably mounted in a back surface of said plate.

20. An audio signal manipulator system for manipulating stored audio signals from an audio input device in a manner generally comparable to manipulating a vinyl record, said system comprising:
- a multimedia input apparatus for receiving a plurality of digital signal inputs, said multimedia input apparatus comprising:
  - a housing having a front wall, a back wall and a peripheral wall extending between said front and back walls, said front wall having a plurality of openings extending into a plurality of multimedia bays, said plurality of multimedia bays including a first, a second, a third, and a fourth multimedia bay;
  - a plurality of multimedia drive units for reading media, each of said multimedia drive units being removably positioned in a respective multimedia bay of said housing, said plurality of multimedia drives comprising:
    - a compact disc drive unit being removably positioned in said first multimedia bay for reading a compact disc media;
    - a floppy disk drive unit being removably positioned in said second multimedia bay for reading a floppy disk media;
    - a high capacity storage drive unit being removably positioned in said third multimedia bay for reading a high capacity storage device media;
    - a digital video disk drive unit being removably positioned said fourth multimedia bay for reading a digital video disk media;
  - a plurality of eject buttons being mounted on said front wall of said housing for ejecting said media from said multimedia drive units, each of said eject buttons being electrically connected to a respective multimedia drive unit, each of said eject buttons being positioned generally adjacent to a respective multimedia drive unit; a console for storing and manipulating said digital signal inputs from said multimedia input apparatus, said console being electrically connected to said multimedia input apparatus, said console comprising:
    - a case having a front wall, a back wall, and a peripheral wall extending between said front wall and said back walls of said case, said case comprising a substantially rigid material;
    - control circuitry mounted in said case for controlling said console and for controlling reception of said digital signal inputs from said multimedia input apparatus;
    - a pair of control panels for controlling storage and playing of said digital signal inputs, each of said control panels being mounted on said front wall of said case, each of said control panels being electrically connected to said control circuitry, each of said control panels comprising:
      - a current display for indicating a track of said media currently playing in one of said multimedia drives units;
      - a pair of queue displays for indicating a track of said media in one of said multimedia drives units;
      - a plurality of selectors for selecting a track of said media in one of said multimedia drives units, each of said selectors being position generally adjacent to a respective display, each of said selectors comprising a touch sensitive screen;
      - a queue selector for selecting between one of said tracks of media displayed in one of said queue displays and said track currently being played, said queue selector being positioned generally between said current display and said pair of queue displays;
      - a plurality of media controls for controlling said media in each of said multimedia drives units, said plurality of media controls being positioned generally adjacent to said queue selector, said plurality of media controls comprising:
        - a play button for playing a track of said media;
        - a stop button for stopping the playing of a track of said media;
        - a forward button for advancing a track of said media;
        - a reverse button for reversing a track of said media;
        - a fast forward button for quickly advancing a track of said media;
        - a fast reverse button for quickly reversing a track of said media;
        - a pitch control for controlling a pitch of a track of said media;
        - a playback speed control for controlling a speed of a track of said media being played back;
      - a plurality of remote eject buttons for remotely ejecting said media from one of said multimedia drive units, each of said eject buttons being positioned generally between each of said control panels;
    - a plurality of jacks being mounted on said back wall of said case for electrically connecting said console to said multimedia input apparatus and to a plurality of peripheral devices, each of said jacks being electrically connected to said control circuitry, said plurality of jacks comprising:
      - a plurality of RCA-type jacks for electrically connecting said console to a turntable, a cassette player or a pair of headphones;

a plurality of MIDI-type jacks for electrically connecting said console to a plurality of midi devices such as a keyboard, each of said midi jacks being positioned generally adjacent to said RCA-type jacks;

a digital jack for receiving and transmitting digital audio signals a peripheral device having a digital jack such as a compact disk player;

a small computer system interface jack being connected to a small computer interface jack of said multimedia input apparatus, wherein said console is in digital communication with said multimedia input apparatus;

an effects unit for digitally altering said digital signal inputs from said multimedia input device, said effects unit being removably mounted on said front wall of said case, said effects unit being positioned generally between said queue selector and said pair of queue displays, said effects unit being electrically connected to said control circuitry;

a manipulating assembly for manipulating said media currently playing in said console, said manipulating assembly comprising:

a phonograph for playing vinyl records, said phonograph including:

a base having an upper surface and a lower surface;

a turntable movably mounted on said upper surface of said base of said phonograph;

an effects disk for manipulating the media stored in and currently playing in said console, said effects disk being selectively mountable on said turntable, said effects disk including a top surface having a plurality of notches extending therein, each of said notches being positioned generally adjacent to one another such that a gear track of said notches is defined, said gear track extending around said disk and positioned generally adjacent to a peripheral edge of said effects disk, said top surface of said effects disk having a plurality of pits extending therein, each of said pits being positioned generally adjacent to one another such that an optical track is defined, said optical track being positioned between said gear track and said peripheral edge of said effects disk;

a stand being removably mountable to said base of said phonograph, said stand including:

an upstanding member having a first portion and a second portion selectively telescoping from said first portion;

wherein said first portion has a first end, a second end and a peripheral wall extending between said first and second ends, said first end having a opening extending into a cavity of said first portion;

wherein said second portion has a first end, a second end and a peripheral wall, said second end of said second portion being movably positioned in said cavity of said first portion;

a fastening member for selectively fixing said first portion in a position with respect to said second portion, said fastening member being removably extended through said peripheral wall of said first portion and removably mounted in said peripheral wall of said second portion, said fastening member comprising a thumbscrew;

a clamp assembly for removably clamping said stand to the base of the phonograph, said clamp assembly including:

a lower clamp member extending perpendicularly from a front side of said upstanding member, said lower clamp member being selectively abuttable against the lower surface of the base of the phonograph;

an upper clamp member being movably coupled to said second portion of said upstanding member, said upper clamp member including a plate, a lower surface of said plate having a protruding portion extending downwardly therefrom, said protruding portion being selectively abuttable against the upper surface of the base of the phonograph;

a pair of fastening members for selectively fixing said plate in a position with respect to said upstanding member, each of said fastening members being removably extended through a pair of elongated slots extending through said peripheral wall of said second portion and being removably mounted in a back surface of said plate, each of said slots having a longitudinal axis extending between a said first and second ends of said second portion;

an arm member being pivotally coupled to said second end of said first portion of said upstanding member, said arm member being positioned generally parallel to said clamp assembly positionable over the turntable when said stand is removably mounted to the base of the phonograph;

a pair of transducers for reading a rotational direction and a rotational speed of said effects disk, each of said transducers being mounted on a lower surface of said arm member of said stand, a first of said transducers comprising a gear being positioned generally adjacent to an end of said arm member, said gear having a plurality of teeth, each of said teeth of said gear selectively engaging said plurality of notches of said gear track, a second of said transducers comprising a laser, said laser being positioned generally adjacent to said gear, a light emitted from said laser shinning on said pits of said optical track, each of said transducers being electrically connected to said control circuitry of said console; and wherein said rotational direction of said effects disk on said turntable of said phonograph is interpreted by said gear engaging said notches in said gear track, said rotational speed of said effects disk is interpreted by said light of said laser shining on said plurality of pits in said optical track, wherein said media stored in said console is digitally manipulated to alter said stored media's sound.

\* \* \* \* \*